United States Patent [19]

Wudel et al.

[11] Patent Number: 4,497,841
[45] Date of Patent: Feb. 5, 1985

[54] LOW CALORIE DESSERT MIXES AND PRODUCTS PREPARED THEREFROM

[75] Inventors: John A. Wudel, Orem; Lavar C. McMillan, Murray, both of Utah

[73] Assignee: Wudel Inc., Orem, Utah

[21] Appl. No.: 475,501

[22] Filed: Mar. 15, 1983

Related U.S. Application Data

[63] Continuation-in-part of Ser. No. 357,839, Mar. 15, 1982, abandoned.

[51] Int. Cl.³ ............................................... A23G 9/02
[52] U.S. Cl. .................................................... 426/565
[58] Field of Search ............... 426/565, 804, 566, 567, 426/583

[56] References Cited

U.S. PATENT DOCUMENTS

| | | | |
|---|---|---|---|
| 2,536,137 | 1/1951 | Lundquist | 426/565 |
| 3,236,658 | 2/1966 | Little | 426/804 |
| 3,335,013 | 8/1967 | Wolfmeyer | 426/565 |
| 3,357,840 | 12/1967 | Fisher | 426/565 |
| 4,333,954 | 6/1982 | Trzecieski | 426/565 |
| 4,376,791 | 3/1983 | Holbrook et al. | 426/565 |

OTHER PUBLICATIONS

Arbuckle, W. S., Ice Cream 3rd ed., Avi Pub. Co., Westport, Conn., 1977, pp. 74–91.

*Primary Examiner*—Jeanette Hunter
*Attorney, Agent, or Firm*—Thorpe, North & Western

[57] ABSTRACT

New dessert mixes are obtained by preparing aqueous solutions or dehydrated powders containing butterfat; nonfat dry milk solids containing a certain portion of whey protein concentrate; a fructose-based sweetening agent and a stabilizer. The new mixes are prepared by combining a dry premix of whey protein concentrate and/or other nonfat milk solids, fructose and stabilizers with milk and/or cream; heating the mixture to effect pasteurization and then homogenizing the mixture to form the desired solution which may optionally be dehydrated. The dehydrated powdered mix may be redehydrated and then frozen.

46 Claims, No Drawings

LOW CALORIE DESSERT MIXES AND PRODUCTS PREPARED THEREFROM

This is a continuation-in-part of Ser. No. 357,839, filed Mar. 15, 1982, now abandoned.

BACKGROUND OF THE INVENTION

1. Field of the Invention

This invention relates to new and improved dessert premixes and mixes. More specifically, the invention relates to new dessert premixes and mixes preferably containing only natural products which are capable of being converted to frozen products having very attractive properties.

More particularly, the invention provides new dessert premixes and mixes based on natural products preferably containing no added sucrose or glucose and having attractive consumer properties, such as reduced calorie content and improved sweetness and taste. The new dessert mixes comprise dehydrated powders or aqueous solutions having a solids content made up of butterfat; nonfat dry milk solids, a portion of which are preferably whey protein concentrate; a sweetening agent consisting of at least 75% by weight fructose; and one or more stabilizers which preferably contain at least a stated amount of microcrystalline cellulose. A premix powder consisting of whey protein concentrate, fructose, stabilizers and other additives such as egg solids, flavoring agents and other milk solids is first prepared. The new mixes are prepared by combining the premix with appropriate amounts of milk and/or cream, heating the mixture to effect pasteurization and then homogenizing the mixture to form the desired dispersion. The new invention also provides valuable products, such as soft dessert ice cream mixes, hard ice cream, etc., prepared by subjecting the aforementioned solutions to a freezing process. In addition, the homogenized solutions may be dehydrated to form a powdered mix which can be rehydrated and then frozen.

2. Prior Art

A great variety of different types of dessert mixes which can be frozen to produce soft and hard ice cream products has been prepared in the past. Most of these products have been based on the use of sucrose and have a high caloric content. In the interest of weight reduction, attempts have been made to produce products by substituting materials for the sucrose, but the attempts, heretofore, have not been entirely satisfactory. In many cases, these products have been deficient in taste or body and texture, and either it has been difficult to freeze them, or retain their composition at the freezing temperatures, or too expensive to produce them for large scale consumption.

Arbuckle, *Ice Cream*, 3rd Edition, AVI Publishing Co., Inc., 1977, pp. 80-91, discloses various sources of sweetener solids for use in making ice cream. Various mono- and di-saccharides in numerous stages of refinement are listed. Arbuckle recites that authorities consider an acceptable zone of sweetness for ice cream to be between about 13 and 20% by weight concentration based on sucrose. Considering sucrose to have a sweetening value of 100, fructose has a relative sweetness of 173, and invert sugar (a mixture of glucose anf fructose obtained by the hydrolysis of sucrose) has a relative sweetness of 127. Glucose has a sweetening value of 74.

Because glucose and invert sugar (mixture of glucose and fructose) are monosaccharides or monosaccharide mixtures having a relative low molecular weight of 180.1, they tend to depress the freezing point of ice cream more than higher molecular weight sugars such as sucrose, lactose, maltose and converted corn syrup solids. Arbuckle states that this effect on freezing point limits the amount of monosaccharide in ice cream to about 25% of the total desired sugar. In other words, at least 75% of the sweetening agent must be a di- or oligosaccharide.

Moreover, the relative sweetness of monosaccharides does not necessarily transfer proportionately when substituted for sucrose. Arbuckle states that it requires 1.05 pounds of invert sugar to equal one pound of sucrose even though invert sugar is purportedly 1.27 times as sweet as sucrose. However, invert sugar contains 25% to 30% water. Arbuckle also states that it takes 1.25 pounds of glucose to replace one pound of sucrose. Therefore, due to the lowering of the freezing point and the lack of direct translation of sweetening powers, it is not recommended to prepare an ice cream having a monosaccharide as the only added sugar. Arbuckle states that invert sugar should not replace more than 33% of the sucrose when making ice cream and that dextrose, i.e., glucose, should not replace more than 35% of the sucrose. By the same reasoning, Arbuckle states that honey, which is a mixture of 17.5% moisture, 74.5% invert sugar (glucose and fructose), 2% sucrose, 2% dextrin and 3.8% miscellaneous matter requires 1.4 pounds to equal one pound of sucrose and should not replace more than 30% of sucrose in ice cream.

Arbuckle makes several sugar (sucrose)-saving suggestions to stretch a manufacturer's allotment of cane or beet sugar (sucrose), such as replacing sucrose with corn sugar or corn syrup solids; replacing part of the sugar with milk solids and inverting up to ⅓ of the sucrose. None of the suggestions teaches or even indicates that sucrose can be entirely replaced or even replaced by a majority of a monosaccharide such as fructose. In fact, Arbuckle states on page 38 that an appropriate ice cream sweetener can be obtained only by using some sucrose in the blend. The percentage of sweetening agent which can be blended with sucrose depends upon various factors such as desired sugar concentration, total solids content, effect on physical properties such as freezing point, viscosity and whipping ability and the inherent relative sweetening power of the sweetening agent. All illustrations and tables in Arbuckle indicate that at least two-thirds of the sweetening agent must be sucrose.

Koerver, in U.S. Pat. No. 2,500,315, teaches an ice cream with an increased lactose (milk sugar which is a disaccharide) content, and Decker, in U.S. Pat. No. 3,510,316 teaches a nonfat dairy dessert where part of the sugar (sucrose) is replaced by a less sweet corn syrup (28 DE). According to Arbuckle, about 80% of a low-conversion corn syrup is made up of polysaccharides consisting of three or more monosaccharides linked together.

However, none of the prior art surveyed suggests that sucrose can be replaced entirely, or even substantially, as a sweetener for ice cream by another sugar or blend of sugars.

Arbuckle states that about 25% of the MSNF (milk solids not fat) content of ice cream may be supplied by dried whey which is listed as being 13.4% protein (lactalbumin), 76.1% lactose and 10.5% mineral salts. In the same paragraph, MSNF is listed as 35.8% protein (27.1% casein and 8.7% lactalbumin), 54.4% lactose and 9.8% mineral salts. Arbuckle further states that a high quality, good flavored dry buttermilk can be used to replace all of the MSNF of a mix without affecting texture or taste. The use of sodium caseinate and low lactose skim milk is also mentioned. Sodium caseinate is said to produce a slight undesirable flavor in finished ice cream products. However, there is no mention that a product rich in whey proteins, such as a whey protein concentrate or isolated whey proteins, can be utilized at all.

OBJECTS OF THE INVENTION

It is an object of the invention, therefore, to provide an improved type of dessert premix and mix. It is a further object to provide an improved type of dessert mix which is prepared from natural products and can be converted by freezing to form a variety of ice cream type products. It is a further object to provide new dessert premixes which are preferably free of sucrose which can be converted to frozen products having desirable sweetness and taste by the addition of milk and/or cream. It is a further object to provide new dessert mixes which preferably contain no added sucrose or glucose and which can be converted to sweet-tasting dessert products which have a reduced sugar content. It is a further object to provide new dessert mixes containing fructose which can be converted to frozen products having attractive physical and nutritional properties. It is a further object to provide new and improved soft dessert ice cream products and hard ice cream products. These and other objects of the invention will be apparent from the following detailed description thereof.

SUMMARY OF THE INVENTION

The new dessert mixes of the present invention comprise aqueous solutions or suspensions having a solids content made up of butterfat, nonfat dry milk solids (a portion of which is preferably whey protein concentrate), a special proportion of substantially pure fructose and a stabilizer preferably containing microcrystalline cellulose. While less preferred, up to about 25% of the fructose can be replaced by other sweetening agents such as corn syrup solids, maltose, glucose, sucrose, honey, invert sugar, saccharin and aspartame.

It is also possible to produce an acceptable mix without the use of a whey protein concentrate forming part of the nonfat dry milk solids. However, because of the improved characteristics attributed to the use of whey protein concentrate, its inclusion as part of the nonfat milk solids is clearly preferred. As used herein, the term whey protein concentrate shall be deemed to include an equivalent amount of isolated whey protein.

A premix is first prepared which is a powder consisting of whey protein concentrate or other nonfat milk solids, fructose-based sweetener, a stabilizer-emulsifier mix, and other ingredients such as egg solids, flavorings, and additional milk solids such as nonfat dry milk, dry buttermilk, caseinate salts or low lactose skim milk. For purposes of brevity, the stabilizer-emulsifier mix may be referred to as "stabilizer" only. The new mixes are preferably prepared by combining the premix components together with milk and/or cream along with other added milk solids and flavorings if desired; and heated the mixture to effect pasteurization; and then homogenizing the mixture to form the desired liquid mixture. In a home environment, it may not be possible to pasteurize and homogenize the liquid mixture prior to freezing. If desired, the liquid mixture may be dehydrated to powdered form by means of freeze-drying or any other water removal process which will not substantially affect the characteristics of the mix such as color, flavor and nutritional qualities. The powdered mix can then be diluted with water just prior to use. Valuable products, such as soft ice cream mixes, hard ice cream, etc., are obtained by subjecting these liquid mixtures to a freezing process.

It has been found that the new dessert mixes of the present invention possess many valuable and attractive properties. It has been found, for example, that the products prepared therefrom, such as the soft ice cream mixes and the hard ice cream, have reduced sugar content and are particularly attractive for dietary purposes. In addition, the products have improved sweetness and taste despite the elimination of all or substantially all of the conventional sucrose sugar. Further advantage is found in the fact that, particularly in the case of the soft dessert mixes, there can be an increase in overrun during freezing which results in an even lower calorie content and lower cost of operation. Contrary to the allegations of the prior art, it has been found that surprisingly, the fructose-sweetened dessert mixtures can be frozen at, or near, the usual ice cream freezing temperatures without any undue depression in the freezing point.

DETAILED DESCRIPTION OF THE INVENTION

The new dessert mixes of the present invention are preferably prepared by mixing butterfat, nonfat dry milk solids, a portion of which are preferably whey protein concentrate or isolated whey protein, a special proportion of fructose-based sweetener and a stabilizer with the desired milk and/or cream; heating the mixture to effect pasteurization; and then homogenizing the mixture. Additional ingredients such as flavoring, color, fruit, nuts, honey, eggs, etc. may be added to the mixture after the pasteurization or homogenization to produce the product desired.

Preferably, the dry ingredients consisting of the whey protein concentrate or other milk solids, fructose-based sweetener and stabilizer mix will be precombined into a premix. Other ingredients such as egg solids, flavorings, and additional milk solids such as skim milk, buttermilk powder, caseinate salts, or low lactose skim milk may also be added to the premix. It will then be necessary to add the premix only to the desired amount of skim milk, milk, and/or cream (and additional butterfat if necessary), before freezing.

The dessert mixes of the present invention may be used to prepare two primary types of frozen desserts, i.e., ice cream including frozen custard or french vanilla, and ice milk. The principle difference between ice cream and ice milk resides in the fat and total solids content of the liquid mixes. Ice cream generally has about 8-20% fat content and from about 35-49% total solids. On the other hand, ice milk has a fat content between about 2% and 7% and a solids content of about 24-34%. Either the ice cream mix or ice milk mix may be used to prepare hard or soft serve products. However, the ice milk mix is preferably used for soft serve. The upper limit for fat content is determined by preferences of taste and physical properties of the ice cream. There are specialty ice creams which contain fat contents of 25% or higher. Frozen dessert mixes having fat contents in the range of 2-25% are within the scope of this invention.

The mixes may be made available in three different forms which may ultimately be used to prepare the same frozen dessert. The first form is a liquid mixture or aqueous suspension of all ingredients. This liquid mixture has been pasteurized and homogenized in the manner described herein and is ready to be frozen. The second form consists of a dry mixture obtained by dehydrating the liquid mixture to a powder by freeze-drying or equivalent means. This powder contains all essential ingredients and needs only to be remixed with water before freezing. The third form consists of the premix of dry ingredients including fructose, whey protein concentrate isolated whey protein or other milk solids, stabilizers, other milk solids if necessary, and any other ingredients such that the premix need only be mixed with cream and milk and/or skim milk before freezing.

The invention will first be described in terms of the liquid mixture comprising form one and the dried powder comprising form two since they are each complete formulations of a dessert mix. The premix suitable for combination with various combinations of milk and cream will then be described in detail.

The liquid aqueous mixture or suspension will generally comprise the following ingredients or solids contents in percentages by weight.

| Ingredient | Overall Range | Range (Preferred) | Range (Preferred) |
|---|---|---|---|
| Butterfat | 2-25 | 2-7 (3-6) | 8-25 (12-18) |
| MFNS | 8-15 | 8-15 (11-13) | 10-14 (10-13) |
| Fructose-Based Sweetener* | 7-18 | 7-13 | 9-8 |
| Pure Fructose Crystalline** | 7-14 | 7-11 (8-10) | 9-14 (10-13) |
| Stabilizers | .5-2.5 | .5-2.5 (.7-2.0) | .5-2.5 (.7-2.0) |
| Egg Yolk Solids | 0-1.5 | 1.0- (.25-1.0) | 0-1.5 (.5-1.5) |
| Milk Solids | 10-35 | 10-22 | 18-35 |
| TOTAL SOLIDS | 24-49 | 24-34 | 35-49 |

*Range for fructose combined with other sugars such as glucose, sucrose, maltose and corn syrup solids.
**Range for fructose when used alone.

Similarly, a dehydrated or dried mixture (discounting any moisture present) will generally have the following weight percentage range:

| Ingredients | Overall Range | Soft Serve or Ice Milk Range | Ice Cream Range |
|---|---|---|---|
| Butterfat | 6-57 | 6-29 | 16-57 |
| MNSF | 20-63 | 24-63 | 20-40 |
| Fructose-Based Sweetener | 20-53 | 20-53 | 20-50 |
| Stabilizers | 1-10 | 1.4-10 | 1.0-7.0 |
| Egg Yolk Solids | 0-4.5 | 0-4 | 0-4.5 |
| Milk Solids | 39-76 | 39-75 | 48-76 |
| TOTAL SOLIDS | 100 | 100 | 100 |

The butterfat employed in the new mixes may be any suitable butterfat, but is preferably butterfat from fresh cow's milk or cream. The preferred butterfat preferably contains as major triglycerides $C_4$ to $C_{10}$ saturated fatty acids, $C_{14}$ saturated fatty acids, $C_{16}$ saturated fatty acids, $C_{18}$ saturated fatty acids and $C_{18}$ unsaturated fatty acids. The proportion of each will vary depending on the season, temperature, etc. Generally, the preferred fats contain 8 to 12% $C_4$ to $C_{10}$ saturated acids, 8 to 12% $C_{14}$ saturated acids, 30 to 40% $C_{16}$ saturated acids, 8 to 12% $C_{18}$ saturated acids, and 25 to 35% unsaturated acids.

As previously mentioned, the amount of the butterfat added to the dessert mix may vary over a wide range depending upon the type of product desired, i.e., ice cream or ice milk mix. In general, the amount of the butterfat in the solutions prepared from the milk and cream will vary from about 2 to 25%, and preferably from 2 to 20%. In making the ice milk and soft dessert mixes, it is permissible to employ solutions containing about 2 to 7%, and preferably 3 to 6%, by weight of the butterfat, and in making the hard ice cream dessert product, it is permissible to employ liquid mixtures containing 8% to about 25%, and preferably 12 to 18%, by weight of butterfat.

The second component in the dessert mixes of the present invention comprises a blend of nonfat dry milk solids. Preferably, at least a portion of the nonfat dry milk solids is a whey protein concentrate or isolated whey protein. The main ingredients of nonfat dry milk solids include lactose (milk sugar), protein, and minerals, such as calcium. Minute amounts of fat may also be present. Other components include Vitamin A, pantothenic acid, riboflavin, thiamine, niacin and other minerals, such as phosphorus, potassium, sodium and iron. Particularly preferred nonfat dry milk solids to be used are whey protein concentrates, skim milk powders and dry buttermilk powders and mixtures thereof. These sources of nonfat milk solids contain about 45 to 55% lactose, 30 to 38% protein, 0.5 to 5.0% fat, and 6 to 10% minerals. However, the protein content of the whey protein concentrate may vary between about 25 to 75 percent. A method for preparing the nonfat dry milk solids can be found in Hall, et al., *Drying of Milk and Milk Product*, AVI Publishing Co., 1971. The major portion of nonfat milk solids may preferably be supplied by liquid skim milk, milk and/or cream.

Whey protein concentrate is defined by the United States Food and Drug Administration as the substance obtained by the removal of sufficient non-protein constituents from whey so that the finished dry product contains not less than 25% protein. This product may not contain more than 60% lactose and has a mineral content between 2 and 15%. Whey protein concentrates are commercially available having protein content ranging from about 25 to 75%. A particularly preferred whey protein concentrate for use in the present invention has a protein, lactose and mineral content which is approximately the same as nonfat dry milk solids and is sold under the tradename "Protec". Protec powder contains about 35% protein, 54% lactose, 1% fat and 10% minerals and moisture. Whey protein concentrates containing higher protein concentrations may also be advantageous. Higher whey protein content adds to the body of a frozen product by strengthening the lamella surrounding the air sac in the frozen product. In addition, higher whey protein means less lactose in the concentrate. Reduced lactose is preferable since lactose crystallizes out increasing the sandy texture of the frozen product. In this context, the entire milk solids not fat content of the milk could be whey protein concentrate. However, federal and state regulations currently limit the amount of whey solids of any kind which can be used in frozen dessert mixes.

Isolated whey protein may be used in the place of whey protein concentrate in equivalent protein amounts. Thus, one pound of 50% whey protein concentrate may be substituted by one-half pound of isolated whey protein. The term "whey protein concentrate" as used herein is, therefore, deemed to include an equivalent amount of isolated whey proteins.

Another difference betwen whey protein concentrate and nonfat dry milk is in the quality of the protein. As noted by the earlier citation to Arbuckle, supra, the 35.8% protein in nonfat dry milk is about 27.1% casein and 8.7% lactalbumin. Whereas, in whey, essentially all of the protein is lactalbumin (including lactaglobulin). According to the National Dairy Council, whey proteins are higher in nutritive value than casein. Casein has a protein efficiency ratio (PER) of 2.5 whereas the PER for whey protein is about 3.6.

It has been found that between about 10 and 100% of the nonfat dry milk solids may be whey protein concentrate in order to obtain the desired results. However, in order to satisfy federal and state regulations, they whey protein concentrate must presently be limited to not more than 25 to 35% of the milk solids not fat. A preferable range is between about 10 and 35% of the milk solids. Thus, the addition of whey protein concentrate favorably affects both the nutritional and physical qualities of the frozen desserts of the invention.

In addition to nonfat dry milk and whey protein concentrate, it may be desirable to utilize dry buttermilk powder as a source of nonfat dry milk solids. Dry buttermilk contains more fat than nonfat dry milk or whey protein concentrate, but has protein and lactose concentrations which are about the same as nonfat dry milk. The approximate composition of dry buttermilk, according to Arbuckle, is 3.9% moisture, 4.7% fat, 35.9% protein, 47.8% lactose and 7.7% ash. When using dry buttermilk, it will be necessary to take the fat content into consideration.

Dry buttermilk can be used in the place of some or all of the nonfat dry milk. Nonfat dry milk, dry buttermilk and other sources of MSNF, such as whey powder and sodium or calcium caseinate and low lactose skim milk, may be utilized as a source of nonfat milk solids. The texture and body of frozen desserts prepared from these sources without the presence of whey protein concentrate is clearly inferior to the desserts prepared with the whey protein concentrate preset, although the flavor is acceptable. Therefore, the presence of whey protein concentrate is not absolutely essential to prepare fructose-sweetened frozen dessert within the broadest aspects of the present invention. However, within the confines of its preferred embodiment, whey protein concentrate or its equivalent in isolated whey protein is a highly preferable, if not essential, ingredient. While not known for a certainty, it is believed that the whey proteins are superior in whipping ability to other nonfat milk solids. Whipping ability is based, in part, on the cohesion and strength of the lamellae. Higher whey protein concentrations in the source of nonfat milk solids are thought to produce superior products since they increase the whipping ability and reduce the lactose content and its attendant propensity toward creating a sandy texture in the frozen product. Somewhat similar, but less acceptable, results are obtained through the use of low lactose skim milk which contains the same ratio of casein to whey proteins as skim milk. The higher the protein content of the whey protein concentrate is, the lower the total whey protein concentrate content can be overall.

The amount of the nonfat dry milk solids to be employed may vary over a considerable range depending upon the type of product desired. In general, the amount of the nonfat dry milk solids to be employed in the dry mix comprises about 20% to about 40% by weight, and in the aqueous solutions, about 8% to about 15% by weight. In the soft dessert mixes, the preferred amount of blended nonfat dry milk solids range from about 8% to about 15% by weight in the aqueous solution, and in the hard ice cream from about 10% to about 14% by weight in the aqueous solution.

The third essential ingredient in the dessert mixes of the present invention comprises the substantially pure crystalline fructose. High fructose corn syrup and other components containing large amounts of fructose are less preferable for use in the present invention. While less preferable, it is possible to prepare acceptable dessert mixes wherein the sweetening agent is not pure fructose. These sweetening agents must be at least seventy-five percent by weight fructose. When combining fructose with other sweetening agents, great care should be taken not to use more of these alternate sweetening agents than is absolutely necessary. It may be preferable to use small amounts of non-carbohydrate sweetening agents having a high relative sweetness such as aspartame or saccharin to complement the fructose in lowering the caloric content. Less preferable are the conventional carbohydrate sweetening agents such as the various corn syrups, glucose, sucrose, maltose, invert sugar, honey and mixtures thereof. When using a combination of fructose with other sweetening agents, the total fructose-based sweetening agent content may very from about 20% to 53% in the dry mix, and about 7% to about 18% in the aqueous solution. In soft dessert mixes, the amount can vary from about 7% to about 13% by weight in the aqueous solution; and in hard ice cream products, the range will vary from about 9% to 18%.

It is especially preferred that the sweetening agent employed is pure crystalline fructose free of other sugars, such as glucose, sucrose, etc. The crystalline fructose should be employed in the new mixes in amounts varying within certain limits. The amount of fructose may vary from about 20% to about 40% in the dry mix, and about 7% to about 14% in the aqueous solution. In making the soft dessert mixes, the preferred amount of fructose to be used ranges from about 7% to about 11% by weight in the aqueous solution, and in the hard ice cream products, the preferred amount of fructose will range from about 9% to about 14% in the aqueous solution.

Stabilizers, emulsifiers, fillers and other additives are also included in the dessert mixes of the present invention. Microcrystalline cellulose is preferably included as one ingredient of the stabilizer-emulsifier combination. The stabilizer used may also contain any other suitable stabilizing agents, such as cellulose gum (carboxymethyl cellulose), gum tragacanth, India gum, karaya gum, locust bean gum, guar gum, Irish moss, agar-agar, gelatin, pectin, carageenan, sodium alginate and psyllium seed extract. Mono- and diglycerides are preferably added as emulsifiers. Polyoxyethylene derivatives of hexahydric alcohols, glycol and glycol asters may also be used as emulsifiers. Preferred stabilizers and emulsifiers to be used comprise a mixture containing from 20 to 50% by weight of microcrystalline cellulose. Preferably, the microcrystalline cellulose will be combined with cellulose gum (CMC), carageenen and mono- and diglycerides. More particularly, it has been found that an especially preferred stabilizer comprises 20 to 50% microcrystalline cellulose, 20 to 40% monoand diglycerides, 10 to 25% CMC (sodium carboxymethyl cellulose) CMC and 1 to 10% carageenen. The amount of the stabilizer and emulsifier to be employed may vary over a considerable range. In some jurisdictions, the maximum amount of stabilizer is 0.5% and the maximum allowable amount of emulsifier is 0.2%, making a maximum total of 0.7%. In general, the amount of stabilizer and emulsifier will vary from about 0.5% to about 2.5%, and more preferably in an amount varying from about 0.7% to 2.0% by weight.

Since, in its preferred embodiment, the fructose content of the mixes of this invention is much less than the sucrose content in conventional frozen dessert mixes (7–14% for fructose as compared to 12–20% for sucrose), the total solids content will also generally be less for comparable products. The solids can be bolstered somewhat by increasing the milk solids not fat and butterfat contents. However, in order to maintain the reduced caloric content obtained by the relatively low fructose content, it is not desired to substantially increase the total solids. It is, therefore, essential to utilize a stabilizer which will efficiently function to maintain the desired body and texture of the frozen mix by combining with the generally higher water content. In this regard, it has been found desirable, if not essential, to incorporate the above-mentioned finely divided microcrystalline cellulose into the stabilizer.

Egg yolk solids are also a desired part of the dessert mixes to improve texture, whipping ability and firmness. Because egg solids tend to oxidize more easily than other ingredients, and acquire an off-flavor, it is desired to add fresh eggs to the mix along with the milk and cream just prior to freezing. It is preferred to have about 0.25 to 1.5% of the total solids of the mix as egg yolk solids. This translates, essentially, into about 1 to 6% by weight fresh eggs or 0.33 to 2% as dried whole egg solids. Dried egg yolk solids or dry whole egg solids may be added to the premix if desired. However, the premix should be utilized as soon as possible if dried egg solids are incorporated.

As used herein, terms such as aqueous solution or liquid mixture are used in a generic sense to include dispersions, colloidal suspensions and true solutions. The physical nature of such solutions or mixtures may vary according to the ingredients, processing techniques, etc.

The product can be prepared in a variety of methods. For example, a dry premix can be prepared by first combining the whey protein concentrate and/or other nonfat milk solids, fructose-based sweetener stabilizer-emulsifier mix (and egg solids if desired), and subsequently adding an appropriate amount of liquid milk and/or cream (and fresh eggs) to furnish the required nonfat milk solids, butterfat and aqueous medium; or all of the ingredients can be combined at the same time, i.e., by combining the nonfat milk solids, whey protein concentrate, fructose-based sweetener, stabilizer and butterfat (as a separate component or as a component in the milk or cream) with the desired amount of milk and/or cream and fresh eggs. Whatever way the products are prepared, the resulting aqueous solution should preferably have a solids content varying from about 24% to about 49% by weight.

Dry mixes can also be prepared by making the aqueous solution and then spray-drying the mixture to remove the water. As a result, the butterfat will be included in the dry mix and the desired product can be obtained by merely adding water.

Other ingredients may be added to the dessert mix as dry solids or to the aqueous solutions or mixtures prepared therefrom. For example, it may be desirable to add components such as honey, nuts and flavoring material such as cocoa, carob, vanilla, fruits and fruit flavors, etc. Calcium lactate or sulfate may be added as calcium builders. Vitamin A and D, which are generally added to fortify milk, may be added. The amount of the added component and the time for adding the material may vary over a considerable range depending upon the nature of the finished product desired.

As noted, the new dessert mixes may be prepared by a variety of different methods. If a dry solid premix is prepared first, it may be prepared by merely mixing the dry components together in any desired order and then combining the mixture with the aqueous and fat components such as skim milk, milk, cream, etc.

After the aqueous dispersion has been prepared, the mixture is then heated to effect pasteurization. The temperature employed and the time of heating will vary over a wide range, depending upon the product desired. In general, pasteurization temperatures range from about 145° F. to about 204° F. The procedure generally varies from a low of 30 minutes at 145° to a high of 204° for about 0.05 second as specified in 37 C.F.R. 131.3(b) which pertains to dairy products in general. According to 37 C.F.R. 135.3, frozen dessert mixes are to be pasteurized at a low of 155° F. for 30 minutes to a high of 175° for 25 seconds.

Following pasteurization, the mixture is homogenized. This involves passing the liquid mix through exceeding narrow slits or openings commonly known as homogenizing valves. The pressure at which the liquid is pumped is regulated by the closure of the homogenizing valve. In some case, it may be necesssary to employ a second stage. In general, pressures generally range from about 1,000 to 5,000 psig where, in a two-stage process, the first stage employs a pressure of 2,000 to 5,000 psig and the second stage a pressure of 1,000 psig.

The homogenized product, as prepared above, is then utilized to produce a variety of different types of valuable dessert products. For example, the products may be frozen at a suitable temperature to prepare ice milk, soft ice milk, soft ice cream, and hard ice cream products. When freezing, the materials may be frozen according to conventional procedure wherein the aqueous dispersion is added to the mixing equipment involving stirring and the reduction of temperature. Suitable temperatures range from about 19° F. to a about 22° F. In making the hard ice cream product, the freezing should preferably be sufficient to produce a 0° core by the end of 24 hours of hardening.

As noted above, one advantage of the new products of the invention, particularly in the case of the soft dessert product, is that in freezing, an overrun of 35% to about 100% is obtained. This results in a reduction in the calorie content as well as cost of production. Also, the liquid mixture may be frozen at or near the usual freezing temperatures even when crystalline fructose is used as the only added sugar.

In addition, the products of this invention are preferably free from added glucose and sucrose (lactose is a disaccharide containing glucose and galactose). Sucrose and glucose are known to trigger insulin production and are absorbed relatively rapidly into the blood stream. Fructose, on the other hand, is absorbed more slowly into the blood stream and does not require the presence of insulin for absorption across the cell membrane.

Therefore, there may be significant health advantages in a dessert product sweetened with fructose and not containing any sucrose other than just the possibility of lower calorie content. For example, the total sugar contents (lactose plus fructose) are much lower than comparable sucrose-sweetened products.

To illustrate the preparation of the new products of the present invention, the following examples are given. It is to be understood, however, that the examples are given in the way of illustration and are not to be regarded as limiting the invention in any way.

EXAMPLE I

This example illustrates the preparaton of a white, hard ice cream mixture according to the present invention.

5266 pounds of cream containing 40.5% butterfat; 825 pounds of milk containing 1.3% butterfat; 3580 pounds of skim milk; 350 pounds of Protec powder (whey protein concentrate) made up of 35% protein and 54% lactose; and 1665 pounds of skim condensed milk, containing 33.78% total solids, were combined with 1375 pounds of pure crystalline fructose, 114 pounds of a stabilizer made up of 40% microcrystalline cellulose, 20% cellulose gum (CMC), 8% carageenen, 32% mono- and digycerides and 269 pounds of egg solids. This mixture was stirred together at a temperature of 40° F. for 2 minutes. The resulting product has a solids content of:

|  | AS A LIQUID MIX | AS A DEHYDRATED MIX |
|---|---|---|
| butterfat | 16% | 39.4% |
| nonfat milk solids* | 11.5% | 28.3% |
| fructose | 10.25% | 25.2% |
| stabilizer | .85% | 2.1% |
| eggs | 2.0% | 5.0% |
| Total Solids | 40.6% | 100% |

*21.5% whey protein concentrate

The above product was then pasteurized by heating at 175° F. for 25 seconds.

Following pasteurization, the product was homogenized by use of a single stage homogenizer at 2200 psi.

Hard ice cream products at 80% overrun were prepared from the above-noted homogenized mix by freezing at 21° F. for a period of 2 minutes.

The resulting product had a calorie content of about 220 calories per 100 grams, excellent sweetness and taste and very good body. The product retained its hard structure on storage over a period in excess of 180 days.

The above product may be produced in different flavors by the addition of flavorings such as chocolate, strawberry, pineapple, chocolate chip, and the like prior to freezing.

EXAMPLE II

This example illustrates the preparation of a chocolate hard ice cream mixed according to the process of the invention.

2681 pounds of cream having a butterfat content of 40.5% was mixed with 2709 pounds of skim milk; 225 pounds of Protec powder (whey protein concentrate) made up of 35% protein and 54% lactose; and 805 pounds of skim condensed milk. To this was added 935 pounds of pure fructose; 66 pounds of stabilizer as in Example I; 156 pounds of fresh eggs; and 214 pounds of chocolate flavor.

The mixture was stirred together at a temperature of 40° for 2 minutes. The resulting product had a solids content of:

|  | AS A LIQUID MIX | AS A DEHYDRATED MIX |
|---|---|---|
| butterfat | 14% | 32.9% |
| nonfat milk solids* | 11% | 25.8% |
| fructose | 12% | 28.2% |
| stabilizer | .85% | 2.0% |
| eggs | 2% | 4.7% |
| chocolate flavor | 2.75% | 6.4% |
| Total solids | 42.6% | 100% |

*25% whey protein concentrate

The above product was then pasteurized by heating at 175° F. for 25 seconds.

Following pasteurization, the product was homogenized by use of a single stage homogenizer at 2200 psi.

Hard ice cream products were prepared from the above-noted homogenized mix by freezing at 21° F. for a period of 2 minutes.

The resulting product had a calorie content of 234 calories per 100 grams, excellent taste and sweetness and very good texture and body. The product retained its hard structure on storage for a period of time in excess of 180 days.

EXAMPLE III

This example illustrates the preparation of a white soft dessert mix according to the process of the invention.

2.0 pounds of cream containing 40.5% butterfat; 81.5 pounds of milk containing 4.0% butterfat; 1.25 pounds of powdered skim milk; 2.75 pounds of whey protein concentrate powder made up of 35% protein and 54% lactose; 10.5 pounds of pure fructose; 0.7 pounds of stabilizer as defined in Example I above; and 1.3 pounds of chocolate flavor were combined together. This mixture was stirred together at a temperature of 40° F. for two minutes. The resulting product had a solids content of:

|  | AS A LIQUID MIX | AS A DEHYDRATED MIX |
|---|---|---|
| butterfat | 4% | 14.5% |
| nonfat milk solid* | 11% | 40.0% |
| fructose | 10.5% | 38.2% |
| stabilizer | .7% | 2.6% |
| chocolate flavor | 1.3% | 4.7% |
| Total solids | 27.5% | 100% |

23.7% whey protein concentrate

The above product was pasteurized by heating at 175° F. for about 25 seconds.

Following pasteurization, the product was homogenized by use of a single stage homogenizer at 2200 psi.

A soft ice cream product was prepared from the above-noted homogenized mix by freezing at 19° F. for a short period.

The resulting product had excellent taste and sweetness, and very good texture and body. The calorie content was about 115 calories per 100 grams as compared to 150 calories for a comparable sucrose-sweetened product. The product had a very high potential overrun. The amount of overrun for soft serve will vary between about 35 and 100%, depending upon the particular kind of soft serve machine used.

EXAMPLE IV

Exammple III was repeated with the exception that the chocolate flavor was eliminated, and the components were combined in the following amounts: 1.65 pounds cream, 83.63 pounds of milk, 1.9 pounds powdered skim milk, 3.0 pounds of Protec powder (whey protein concentrate), 8.5 pounds fructose and 0.7 pounds of the microcrystalline cellulose containing stabilizer of Example I. The resulting product had a solids content of:

|  | AS A LIQUID MIX | AS A DEHYDRATED MIX |
|---|---|---|
| butterfat | 4.0% | 15.5% |
| nonfat milk solids* | 12.0% | 48.0% |
| fructose | 8.5% | 33.7% |
| stabilizer | .7% | 2.8% |
| Total solids | 25.2% | 100% |

*23.7% whey protein concentrate

EXAMPLE V

Example IV is repeated with the exception that the amount of fructose varied as follows: 6.5% fructose with 3.0% honey, 4.5% fructose with 3.0% honey, related results are obtained. Since honey is approximately 37% fructose, the sweetening agent in both instances was at least 75% fructose.

EXAMPLE VI

The following table is exemplary of ice milk type dessert mixes in both the form of a liquid mixture and a dry powder which fall within the scope of this invention. These mixes may be used to prepare either hard or soft serve products. All ingredients are listed in percent by weight.

EXAMPLE VI FORMULA:

| Ingredient | A $L^1$ | A $D^2$ | B $L^1$ | B $D^2$ | C $L^1$ | C $D^2$ | D $L^1$ | D $D^2$ | E $L^1$ | E $D^2$ |
|---|---|---|---|---|---|---|---|---|---|---|
| Butterfat | 3.0 | 11.5 | 6.0 | 18.8 | 5.0 | 17.4 | 5.0 | 18.1 | 7.0 | 28.0 |
| [3]Milk Solids Not Fat | 3.0 | .0 | 12.0 | 37.5 | 13.0 | 45.3 | 11.0 | 39.9 | 9.0 | 36.0 |
| Fructose | 9.5 | 36.5 | 11.0 | 34.4 | 10.0 | 34.9 | 9.0 | 32.6 | 7.0 | 28.0 |
| Stabilizer | 0.5 | 2.0 | .7 | 2.2 | .7 | 2.4 | .6 | 2.2 | .5 | 2.0 |
| Egg Solids | — | — | 1.0 | 3.1 | — | — | 2.0 | 7.2 | .5 | 2.0 |
| Flavor | — | — | 1.3 | 4.0 | — | — | — | — | 1.0 | 4.0 |
| Total Milk Solids | 16.0 | | 18.0 | 56.3 | 18.0 | 62.7 | 16.0 | 58.0 | 16.0 | 64.0 |
| Total Food Solids | 26.0 | 100.0 | 32.0 | 100.0 | 28.7 | 100.0 | 27.6 | 100.0 | 25.0 | 100.0 |

[1]Liquid Mixture
[2]Dry Powder
[3]Approximately 25% whey protein concentrate having a protein content of about 35%

In the above table, the milk solids not fat can be provided by a number of sources such as powdered skim milk, protein whey concentrate (a partially delactosed whey containing about 25–75% whey protein), dry buttermilk and condensed skim milk. Sources which provide both butterfat and milk solids not fat include cream, whole milk, plain milk powder, condensed whole milk, butter and evaporated milk.

EXAMPLE VII

The following table is also exemplary of ice cream type dessert mixes in both the form of a liquid mixture and a dry powder. These mixes may be used to prepare either hard or soft serve products. All ingredients are listed in percentage by weight.

EXAMPLE VII FORMULA:

| Ingredient | F $L^1$ | F $D^2$ | G $L^1$ | G $D^2$ | H $L^1$ | H $D^2$ | I $L^1$ | I $D^2$ | J $L^1$ | J $D^2$ |
|---|---|---|---|---|---|---|---|---|---|---|
| Butterfat | 10.0 | 28.6 | 10.0 | 28.0 | 11.0 | 30.4 | 12.0 | 32.5 | 12.0 | 32.9 |
| [3]Milk Solids Not Fat | 13.0 | 37.1 | 12.0 | 33.6 | 11.0 | 30.4 | 14.0 | 37.8 | 10.0 | 27.4 |
| Fructose | 9.0 | 25.7 | 10.0 | 28.0 | 12.0 | 33.1 | 10.0 | 27.0 | 12.0 | 32.9 |
| Stabilizer | .5 | 1.4 | .7 | 2.0 | .5 | 1.4 | 1.0 | 2.7 | .5 | 1.4 |
| Egg Solids | 1.0 | 2. | 3.0 | 8.4 | .5 | 1.4 | — | — | 2.0 | 5.4 |
| Flavor | 1.5 | 4.3 | — | — | 1.2 | 3.3 | — | — | — | — |
| Total Milk Solids | 23.0 | 65.7 | 22.0 | 61.6 | 22.0 | 60.8 | 26.0 | 70. | 22.0 | 60.3 |
| Total Food Solids | 35.0 | 100.0 | 35.7 | 100.0 | 36.2 | 100.0 | 37.0 | 100.0 | 36.5 | 100.0 |

[1]Liquid Mixture
[2]Dry Powder
[3]Approximately 25% whey protein concentrate having a protein content of about 35%

EXAMPLE VIII

The table in this example shows both liquid and dry mixes which may be used to prepare hard ice cream products.

EXAMPLE VIII FORMULA:

| Ingredient | K | | L | | M | | N | | O | | P | |
|---|---|---|---|---|---|---|---|---|---|---|---|---|
| | L[1] | D[2] | L[1] | D[2] | L[1] | D[2] | L[1] | D[2] | L[1] | D[2] | L[1] | D[2] |
| Butterfat | 13.0 | 30.8 | 15.0 | 33.7 | 18.0 | 37.9 | 20.0 | 46.5 | 16.0 | 42.3 | 14.0 | 35.9 |
| Milk Solids Not Fat[3] | 14.0 | 33.2 | 13.0 | 29.1 | 12.0 | 25.3 | 11.0 | 25.6 | 10.0 | 26.5 | 10.0 | 25.6 |
| Fructose | 12.0 | 28.5 | 13.0 | 29.1 | 13.0 | 27.4 | 10.0 | 23.3 | 11.0 | 29.1 | 10.5 | 26.9 |
| Stabilizer | 1.2 | 2.8 | .8 | 1.8 | 1.2 | 2.5 | 1.0 | 2.3 | .8 | 2.1 | 1.0 | 2.6 |
| Egg Solids | 2.0 | 4.7 | 1.5 | 3.4 | 2.0 | 4.2 | 1.0 | 2.3 | — | — | 3.5 | 9.0 |
| Flavor | — | — | 1.3 | 2.9 | 1.3 | 2.7 | — | — | — | — | — | — |
| Total Milk Solids | 27.0 | 64.0 | 28.0 | 62. | 30.0 | 63.2 | 31.0 | 72.1 | 26.0 | 68.8 | 24.0 | 61.5 |
| Total Food Solids | 42.2 | 100.0 | 44.6 | 100.0 | 47.5 | 100.0 | 43.0 | 100.0 | 37.8 | 100.0 | 39.0 | 100.0 |

[1]Liquid Mixture
[2]Dry Powder
[3]Approximately 25% whey protein concentrate having a protein content of about 35%

EXAMPLE IX

EXAMPLE IX FORMULA:

| Ingredient | Q | | R | | S | | T | | U | |
|---|---|---|---|---|---|---|---|---|---|---|
| | L[1] | D[2] | L[1] | D[2] | L[1] | D[2] | L[1] | D[2] | L[1] | D[2] |
| Butterfat | 6.0 | 19.9 | 7.0 | 21.5 | 14.0 | 33.1 | 18.0 | 36.5 | 16.0 | 34.4 |
| Milk Solids Not Fat | 8.0[3] | 26.5 | 9.0[5] | 27.6 | 11.0[7] | 26.0 | 11.0[9] | 22.3 | 14.0[11] | 30.1 |
| Fructose-Based Sweetener | 14.0[4] | 46.4 | 13.0[6] | 39.9 | 15.0[8] | 35.5 | 18.0[10] | 36.5 | 12.0[12] | 25.8 |
| Stabilizer | 1.7 | 5.6 | 1.5 | 4.6 | 1.3 | 3.1 | .9 | 1.8 | 2.0 | 4.3 |
| Egg Solids | 0.5 | 1.6 | .5 | 1.5 | 1.0 | 2.3 | 1.4 | 2.9 | 1.0 | 2.2 |
| Flavor | — | — | 1.6 | 4.9 | — | — | — | — | 1.5 | 3.2 |
| Total Milk Solids | 14.0 | 46.4 | 16.0 | 49.1 | 25.0 | 59.1 | 29.0 | 58.8 | 30.0 | 64.5 |
| Total Food Solids | 30.2 | 100.0 | 32.6 | 100.0 | 42.3 | 100.0 | 49.3 | 100.0 | 46.5 | 100.0 |

[1]liquid mixture
[2]dry powder
[3]35% whey protein concentrate having a protein content of about 35%
[4]90% fructose, 10% high conversion corn syrup solids
[5]15% whey protein concentrate having a protein content of about 50%
[6]90% fructose, 10% aspartame
[7]30% whey protein concentrate having a protein content of about 60%
[8]90% fructose, 10% sucrose
[9]10% whey protein concentrate having a protein content of about 75%
[10]80% fructose, 15% regular conversion corn syrup solids, 5% honey
[11]20% whey protein concentrate having a protein content of 50% and 30% dry buttermilk
[12]95% fructose, 5% aspartame The table which follows is illustrative of the ice milk and ice cream-type dessert mixes in both the form of a liquid mixture and a dry powder which can be prepared using whey protein concentrates having different protein contents and fructose-based sweeteners having a minor amount of a sweetening agent other than fructose. These are exemplary only and various other combinations are also possible, without departing from the scope of the invention. For example, the whey protein concentrate could be eliminated and the MSNF could be comprised solely of nonfat dry milk, dry buttermilk, low lactose skim milk or combinations thereof in any ratio or proportion. In addition, minor amounts of sodium caseinate and/or whey could also be added. When using whey, it would be beneficial to use a high protein milk solid such as sodium caseinate since whey is relatively low in protein, i.e., 12–14%. In this regard, an isolated milk-derived protein such as sodium caseinate could be used to increase the protein content of any combination of nonfat milk solids. However, without the presence of the whey proteins provided by the whey protein concentrate or isolated whey protein, the body texture and storage qualitites of the products may be somewhat lacking.

The premix mentioned above for preparing the dessert mixtures will preferably contain all of the essential ingredients, with the exception of egg solids, to prepare an ice cream or ice milk mix merely by the addition of appropriate amounts of milk, cream or a mixture of milk and cream. Some milk solids are essential to the premix and preferably include the whey protein concentrates or isolated whey proteins. However, it is possible to add other milk solids such as nonfat dry milk, powdered whole milk, buttermilk solids, powdered cream, caseinate salts, low lactose skim milk and the like.

Since the premix is an ideal mix to market to individuals for the preparation of homemade ice cream or ice milk, it is preferred to make the premix essentially complete thus requiring only the addition of a combination of milk and cream according to a set recipe to prepare a final frozen product. The recipe could call for the addition of fresh eggs and specify different flavorings to be added. In the alternative, the eggs, if desired, could be added to the premix as whole egg solids or egg yolk solids and various flavorings could also be added to the premix.

It, therefore, follows that the essential ingredients of the premix include the fructose-based sweetener (preferably pure fructose), some milk solids preferably including whey protein concentrate and stabilizers and emulsifiers.

However, because of regulatory limitations as to the amount of whey protein concentrate which can be used, it may be necessary to incorporate powdered skim milk, dry buttermilk, caseinate salts, low lactose skim milk or some other source of MSNF into the premix. As will be demonstrated in the tables and examples which follow, a combination of cream and skim milk can supply the requisite fat content to make a frozen dessert, but can supply only about 40 to 70% of the MSNF required. Therefore, some MSNF which preferably includes whey protein concentrate or a combination of whey protein concentrate plus MSNF from another source, such as skim milk powder, dry buttermilk, caseinate salts or low lactose skim milk, must supply from 30 to 60% of the total dessert MSNF in the premix. Since at least 10% of the total MSNF in the final dessert mix is preferably whey protein concentrate, the minimum ratio of whey protein concentrate to nonfat dry milk in the premix will preferably be at least 0.2:1 and may be entirely whey protein concentrate. Most preferably, the ratio of whey protein concentrate to other sources of nonfat dry milk solids in the premix will vary between about 0.5:1 to 5:1.

In order to satisfy the required solids content in the prepared frozen dessert, the premix will contain between about 10 and 54% MSNF preferably having a whey protein concentrate content as mentioned above, 37 to 86% of a fructose-based sweetener, and 2 to 21% stabilizer and emulsifier. When using pure crystalline fructose, the percentages will vary slightly to about 13 to 54% MSNF having the whey protein concentrate content mentioned above, 37 to 83% pure crystalline fructose and 2 to 21% stabilizer and emulsifier. Egg solids or egg yolk solids sufficient to supply 0.25 to 1.5% egg yolk solids in the frozen dessert may be added. This will generally vary between about 1.25 and 10.5% by weight egg yolk solids in the premix.

The premix is thoroughly blended to provide a uniform mixture which is then packaged in sealed moisture-tight containers. The containers may vary in size depending upon how they are to be used. The premix may be packed in bulk in drums and shipped to dairies or ice cream plants for mixing with large quantities of cream and milk in commercial operations. Smaller containers may be utilized by restaurants or fast food outlets having soft serve machines. Still smaller packets or containers may be provided for home use.

Since there are various combinations of milk and cream which can be combined, the following tables are exemplary only. Fat content of cream and MSNF content of cream and skim milk may vary according to locality, season or government regulations. However, based on the following tables, one skilled in the art can readily determine how to blend a proper premix to be used with a particular cream and milk combination.

TABLE I

COMPOSITION IN PERCENT BY WEIGHT OF VARIOUS DESSERT MIXES OBTAINED BY COMBINING A PREMIX OF WHEY PROTEIN CONCENTRATE DRY SKIM MILK, PURE CRYSTALLINE FRUCTOSE, EGG YOLK SOLIDS AND STABILIZER

| INGREDIENTS | MIX NUMBER | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Butterfat (from cream) | 3 | 3 | 4 | 4 | 5 | 5 | 6 | 6 | 7 | 8 | 9 | 10 | 11 | 11 | 12 |
| Whey Protein Conc. | 3 | 4 | 3 | 3 | 3 | 4 | 5 | 3 | 4 | 5 | 3 | 4 | 3 | 4 | 3 |
| MSNF From Cream, Skim Milk & Skim Milk Powder | 9 | 10 | 9 | 10 | 8 | 9 | 9 | 10 | 10 | 8 | 10 | 11 | 10 | 10 | 10 |
| Crystalline Fructose | 9 | 10 | 9 | 10 | 9 | 10 | 9 | 10 | 9 | 10 | 9 | 10 | 10 | 11 | 10 |
| Egg Yolk Solids | .5 | .5 | .5 | .5 | .5 | .5 | .5 | .5 | .5 | .5 | .5 | .5 | .5 | .5 | .5 |
| Stabilizer & Emulsifier | 1.25 | 1.25 | 1.25 | 1.25 | 1.25 | 1.25 | 1.0 | 1.0 | 1.0 | 1.0 | 1.0 | 1.0 | 1.0 | 1.0 | .75 |
| TOTAL SOLIDS | 25.75 | 28.75 | 26.75 | 28.75 | 26.75 | 29.75 | 30.5 | 30.5 | 31.5 | 32.5 | 32.5 | 36.5 | 35.5 | 37.5 | 35.25 |
| Water | 74.25 | 71.25 | 73.25 | 71.25 | 73.25 | 70.25 | 69.5 | 69.5 | 68.5 | 67.5 | 67.5 | 63.5 | 64.5 | 62.5 | 64.75 |

| INGREDIENTS | MIX NUMBER | | | | | | | | | | | | | | |
|---|---|---|---|---|---|---|---|---|---|---|---|---|---|---|---|
| | 16 | 17 | 18 | 19 | 20 | 21 | 22 | 23 | 24 | 25 | 26 | 27 | 28 | 29 | 30 |
| Butterfat (from cream) | 12 | 13 | 13 | 14 | 14 | 15 | 15 | 16 | 16 | 17 | 17 | 18 | 18 | 19 | 20 |
| Whey Protein Conc. | 4 | 4 | 3 | 4 | 5 | 4 | 3 | 3 | 4 | 3 | 3 | 3 | 4 | 4 | |
| MSNF From Cream, Skim Milk & Skim Milk Powder | 9 | 8 | 10 | 9 | 9 | 9 | 9 | 8 | 9 | 9 | 8 | 7 | 8 | 7 | 9 |
| Crystalline Fructose | 11 | 10 | 11 | 10 | 11 | 10 | 11 | 10 | 11 | 11 | 12 | 11 | 12 | 11 | 12 |
| Egg Yolk Solids | .5 | .5 | .5 | .5 | .5 | .5 | .5 | .5 | .5 | 1.0 | 1.0 | 1.0 | 1.0 | 1.0 | 1.0 |
| Stabilizer & Emulsifier | .75 | .75 | .75 | .75 | .75 | .75 | .75 | .75 | .75 | .75 | .75 | .75 | .75 | .75 | .75 |
| TOTAL SOLIDS | 37.25 | 36.25 | 38.25 | 38.25 | 40.25 | 39.25 | 39.25 | 38.25 | 41.25 | 41.75 | 41.75 | 40.75 | 43.75 | 42.75 | 45.75 |
| Water | 62.75 | 63.75 | 61.75 | 61.75 | 59.75 | 60.75 | 60.75 | 61.75 | 58.75 | 58.25 | 58.25 | 59.25 | 56.25 | 57.25 | 54.25 |

TABLE II

POSSIBLE COMBINATIONS OF CREAM, SKIM MILK AND SKIM MILK POWDER REQUIRED TO MAKE DESSERT MIXES OF TABLE I (COMBINATION PLUS WHEY PROTEIN CONCENTRATE, FRUCTOSE, EGG YOLK SOLIDS AND STABILIZER SHOULD EQUAL 100)

MIX NUMBER

TABLE II-continued

POSSIBLE COMBINATIONS OF CREAM, SKIM MILK AND SKIM MILK POWDER REQUIRED TO MAKE DESSERT MIXES OF TABLE I (COMBINATION PLUS WHEY PROTEIN CONCENTRATE, FRUCTOSE, EGG YOLK SOLIDS AND STABILIZER SHOULD EQUAL 100)

| INGREDIENTS | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1. Cream 40% | 7.5 | 7.5 | 10 | 10 | 12.5 | 12.5 | 15 | 15 | 17.5 | 20 | 22.5 | 25.0 | 27.5 | 27.5 | 30 |
| Skim Milk 8.8% MSNF | 76.92 | 73.63 | 74.33 | 72.14 | 72.83 | 69.54 | 67.21 | 67.21 | 64.63 | 62.04 | 60.53 | 54.65 | 54.24 | 52.05 | 53.02 |
| Skim Milk Powder | 1.83 | 3.12 | 1.92 | 3.11 | .92 | 2.21 | 2.29 | 3.29 | 3.37 | 1.46 | 3.47 | 4.85 | 3.76 | 3.95 | 2.73 |
| 2. Cream 35% | 8.57 | 8.57 | 11.42 | 11.42 | 14.28 | 14.28 | 17.14 | 17.14 | 20 | 22.84 | 25.71 | 28.56 | 31.43 | 31.43 | 34.28 |
| Skim Milk 8.8% MSNF | 75.84 | 72.55 | 72.89 | 70.70 | 71.03 | 67.74 | 65.07 | 65.07 | 62.11 | 59.17 | 57.29 | 51.05 | 50.29 | 48.09 | 48.72 |
| Skim Milk Powder | 1.84 | 3.13 | 1.94 | 3.13 | .94 | 2.23 | 2.29 | 3.29 | 3.39 | 1.49 | 3.50 | 4.89 | 3.78 | 3.98 | 2.75 |
| 3. Cream 30% Fat | 10.0 | 10.0 | 13.33 | 13.33 | 16.66 | 16.66 | 20.0 | 20.0 | 23.33 | 26.66 | 30.0 | 33.33 | 36.66 | 36.66 | 40.0 |
| Skim Milk 8.8% MSNF | 74.42 | 71.13 | 71.0 | 68.80 | 68.67 | 65.38 | 62.21 | 62.21 | 58.80 | 55.37 | 53.03 | 46.33 | 45.10 | 42.91 | 43.04 |
| Skim Milk Powder | 1.83 | 3.12 | 1.92 | 3.12 | .92 | 2.21 | 2.29 | 3.29 | 3.37 | 1.47 | 3.47 | 4.84 | 3.74 | 3.93 | 2.71 |
| 4. Cream 20% Fat | 15.0 | 15.0 | 20.0 | 20.0 | 25.0 | 25.0 | 30.0 | 30.0 | 35.0 | 40.0 | 45.0 | 50.0 | 55.0 | 55.0 | 60.0 |
| Skim Milk 8.8% MSNF | 69.43 | 66.14 | 64.34 | 62.15 | 60.34 | 57.05 | 52.24 | 52.24 | 47.15 | 42.06 | 38.06 | 29.67 | 26.78 | 24.58 | 23.06 |
| Skim Milk Powder | 1.82 | 3.11 | 1.91 | 3.10 | .91 | 2.20 | 2.26 | 3.26 | 3.35 | 1.44 | 3.44 | 4.83 | 3.72 | 3.92 | 2.69 |

| INGREDIENTS | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|
| 1. Cream 40% | 30 | 32.5 | 32.5 | 35 | 35 | 37.5 | 37.5 | 40 | 40 | 42.5 | 42.5 | 45 | 45 | 47.5 | 50 |
| Skim Milk 8.8% MSNF | 50.82 | 50.43 | 48.23 | 46.74 | 44.55 | 44.13 | 44.13 | 43.76 | 40.47 | 38.40 | 38.40 | 37.99 | 34.70 | 34.31 | 29.53 |
| Skim Milk Powder | 2.93 | 1.82 | 4.02 | 3.01 | 3.20 | 3.12 | 3.12 | 1.99 | 3.28 | 3.35 | 2.35 | 1.26 | 2.55 | 1.44 | 3.72 |
| 2. Cream 35% | 34.28 | 37.14 | 37.14 | 40 | 40 | 42.86 | 42.86 | 45.71 | 45.71 | 48.57 | 48.57 | 51.43 | 51.43 | 54.29 | 57.14 |
| Skim Milk 8.8% MSNF | 46.52 | 45.75 | 43.55 | 41.70 | 39.51 | 38.74 | 38.74 | 37.98 | 34.69 | 32.28 | 32.28 | 31.52 | 28.23 | 27.47 | 22.32 |
| Skim Milk Powder | 2.95 | 1.86 | 4.06 | 3.05 | 3.24 | 3.15 | 3.15 | 2.06 | 3.35 | 3.40 | 2.40 | 1.30 | 2.59 | 1.49 | 3.79 |
| 3. Cream 30% Fat | 40.0 | 43.33 | 43.33 | 46.66 | 46.66 | 50.0 | 50.0 | 53.33 | 53.33 | 56.66 | 56.66 | 60.0 | 60.0 | 63.33 | 66.66 |
| Skim Milk 8.8% MSNF | 40.84 | 39.61 | 37.41 | 35.09 | 32.89 | 31.66 | 31.66 | 30.43 | 27.14 | 24.27 | 24.27 | 23.02 | 19.73 | 18.50 | 12.88 |
| Skim Milk Powder | 2.91 | 1.81 | 4.01 | 3.00 | 3.20 | 3.09 | 3.09 | 1.99 | 3.28 | 3.32 | 2.32 | 1.23 | 2.52 | 1.42 | 3.71 |
| 4. Cream 20% Fat | 60.0 | 65.0 | 65.0 | 70.0 | 70.0 | 75.0 | 75.0 | 80.0 | 80.0 | — | — | — | — | — | — |
| Skim Milk 8.8% MSNF | 20.87 | 17.96 | 15.77 | 11.79 | 9.59 | 6.69 | 6.69 | 3.78 | .49 | — | — | — | — | — | — |
| Skim Milk Powder | 2.88 | 1.79 | 3.98 | 2.96 | 3.16 | 3.06 | 3.06 | 1.97 | 3.26 | — | — | — | — | — | — |

The above Tables were calculated using the following data:
Cream 40% = 40% Fat, 5.35% MSNF, 54.65% H$_2$O
Cream 35% = 35% Fat, 5.69% MSNF, 59.31% H$_2$O
Cream 30% = 30% Fat, 6.24% MSNF, 63.76% H$_2$O
Skim Milk = 8.8% MSNF, 91.2% H$_2$O
Skim Milk Powder = 100% MSNF

TABLE III

DRY PREMIX COMPOSITION IN PERCENT BY WEIGHT WHICH CAN BE COMBINED WITH THE CREAM AND SKIM MILK (EXCLUDING SKIM MILK POWDER) COMBINATIONS OF TABLE II TO MAKE THE DESSERT MIXES OF TABLE I (100 MINUS LBS CREAM AND SKIM MILK IN COMBINATION EQUALS LBS OF PREMIX REQUIRED)

| INGREDIENTS | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Fructose | 57.73 | 53.00 | 57.43 | 55.96 | 61.39 | 55.68 | 50.59 | 56.22 | 50.36 | 55.66 | 53.03 | 49.14 | 54.80 | 53.79 | 58.89 |
| Whey Protein Concentrate | 19.24 | 21.20 | 19.14 | 16.79 | 20.46 | 22.27 | 28.11 | 16.86 | 22.38 | 27.82 | 17.68 | 19.66 | 16.43 | 19.56 | 17.67 |
| Skim Milk Powder | 11.80 | 16.53 | 12.25 | 17.46 | 6.21 | 12.31 | 12.87 | 18.49 | 18.86 | 8.18 | 20.45 | 23.83 | 20.55 | 19.32 | 16.08 |
| Stabilizer | 8.02 | 6.62 | 7.98 | 6.99 | 8.53 | 6.96 | 5.62 | 5.62 | 5.60 | 5.56 | 5.89 | 4.91 | 5.48 | 4.89 | 4.42 |
| Egg Yolk Solids | 3.21 | 2.65 | 3.20 | 2.80 | 3.41 | 2.78 | 2.81 | 2.81 | 2.80 | 2.78 | 2.95 | 2.46 | 2.74 | 2.44 | 2.94 |
| TOTAL | 100 | 100 | 100 | 100 | 100 | 100 | 100 | 100 | 100 | 100 | 100 | 100 | 100 | 100 | 100 |

| INGREDIENTS | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|
| Fructose | 57.38 | 58.58 | 57.08 | 54.79 | 53.79 | 54.50 | 54.50 | 61.54 | 56.26 | 57.57 | 62.80 | 64.66 | 59.11 | 60.44 | 58.57 |
| Whey Protein Concentrate | 20.87 | 23.43 | 15.57 | 21.92 | 24.45 | 21.80 | 21.80 | 18.46 | 20.46 | 15.70 | 15.70 | 17.64 | 19.70 | 21.98 | 14.64 |
| Skim Milk Powder | 15.23 | 10.67 | 20.87 | 16.44 | 15.65 | 16.89 | 16.89 | 12.30 | 16.88 | 17.58 | 12.35 | 7.41 | 12.56 | 7.97 | 18.25 |
| Stabilizer | 3.91 | 4.39 | 3.89 | 4.11 | 3.67 | 4.09 | 4.09 | 4.62 | 3.84 | 3.92 | 3.92 | 4.41 | 3.70 | 4.12 | 3.66 |
| Egg Yolk Solids | 2.61 | 2.93 | 2.59 | 2.74 | 2.44 | 2.72 | 2.72 | 3.08 | 2.56 | 5.23 | 5.23 | 5.88 | 4.93 | 5.49 | 4.88 |

TABLE III-continued

DRY PREMIX COMPOSITION IN PERCENT BY WEIGHT WHICH CAN BE COMBINED WITH THE CREAM AND SKIM MILK (EXCLUDING SKIM MILK POWDER) COMBINATIONS OF TABLE II TO MAKE THE DESSERT MIXES OF TABLE I (100 MINUS LBS CREAM AND SKIM MILK IN COMBINATION EQUALS LBS OF PREMIX REQUIRED)

| TOTAL | 100 | 100 | 100 | 100 | 100 | 100 | 100 | 100 | 100 | 100 | 100 | 100 | 100 | 100 | 100 |
|---|---|---|---|---|---|---|---|---|---|---|---|---|---|---|---|

Various other combinations are possible as the above tables do not include all variables within the scope of the invention. In these tables, the whey protein concentrate varies between bout 23 to 36% of the total MSNF, and the ratio of whey protein concentrate to skim milk powder varies from about 0.75:1 to 3.5:1. The cream and skim milk provides between about 40 to 65% of the total MSNF. The fructose content can also be varied to provide 7–14% solids in the final product. The amounts of stabilizer package and egg yolk solids can also vary. IN addition, other ingredients such as flavorings, fruits, nuts and other additives can be added.

The protein content of the whey protein concentrate can vary anywhere from about 25 to 75% protein or the equivalent amount of isolated whey protein. The pure crystalline fructose sweetener may be substituted with a fructose containing up to 25% of another sugar or combination of sugars. When less than pure fructose is used, the overall sugar content must be raised unless the added sweetening agent is a non-carbohydrate such as aspartame or saccharin.

On a dry basis, the premix ingredients in Table III varied within the following ranges: whey protein concentrate (14–29%), powdered skim milk (6–24%), crystalline fructose (49–65%), stabilizer (3–9%) and egg yolk solids (2–6%) which constitutes a preferred range. As previously stated, the egg yolk solids need not be included in the premix; hence, the range for egg yolk solids may vary from 0 to 6%.

The following examples illustrate a premix and cream/skim milk combinations which can be used to prepare the dessert mixes of Examples I and II. Since most whipping cream sold in supermarkets contain about 35% butterfat, the examples are based on cream containing 35% fat, 5.69% milk solids not fat and 59.31% water; and on a skim milk containing 8.6% milk solids not fat and 91.4% water.

EXAMPLE X

A homogeneous premix was prepared by blending the following ingredients:

| Weight | | % Weight |
|---|---|---|
| 10.25 lbs | Pure Crystalline Fructose | 59.18 |
| 2.87 lbs | Whey Protein Concentrate | 16.57 |
| 2.85 lbs | Skim Milk Powder | 16.45 |
| .85 lbs | Stabilizer and Emulsifier | 4.91 |
| .50 lbs | Egg Yolk Solids | 2.89 |
| 17.32 lbs | | 100.00 |

The above premix was added to the liquid mixture consisting of 45.71 lbs. cream having a fat content of 35%; and 36.97 lbs. of skim milk having an MSNF content of 8.6%. The resulting liquid mixture had a solids content of 39.10% consisting of the following ingredients:

| | Percent |
|---|---|
| Fructose | 10.25 |
| Fat | 16.00 |
| Nonfat Milk Solids* | 11.50 |
| Stabilizer | .85 |
| Egg Yolk Solids | .50 |
| | 39.10 |

*25.0% whey protein concentrate

The liquid mixture can be pasteurized, homogenized and frozen as in Example I.

EXAMPLE XI

A homogeneous premix was prepared by blending the following ingredients:

| Weight | | % Weight |
|---|---|---|
| 12.00 lbs | Pure Crystalline Fructose | 55.76 |
| 2.87 | Whey Protein Concentrate | 13.34 |
| 2.55 lbs | Skim Milk Powder | 11.85 |
| .85 lbs | Stabilizer and Emulsifier | 3.95 |
| .50 lbs | Egg Yolk Solids | 2.32 |
| 2.75 lbs | Cocoa | 12.78 |
| 21.52 lbs | | 100.00 |

The above premix was added to a liquid mixture consisting of 40.0 lbs. of cream having a fat content of 35%; and 38.48% lbs. of skim milk having a MSNF content of 8.6%. The resulting liquid mixture had a solids content of 41.1% consisting of the following ingredients:

| | Percent |
|---|---|
| Fructose | 12.00 |
| Fat | 14.00 |
| Nonfat Milk Solids* | 11.00 |
| Stabilizer | .85 |
| Egg Yolk Solids | .50 |
| Cocoa | 2.75 |
| | 41.10 |

*26.1% whey protein concentrate

This liquid mixture can also be pasteurized, homogenized and frozen as in Example II.

EXAMPLE XII

Alternate premixes suitable for use in blending with the cream and skim milk of Example X are as follows:

EXAMPLE XII

| | I WEIGHT (% WEIGHT) | II WEIGHT (% WEIGHT) | III WEIGHT (% WEIGHT) |
|---|---|---|---|
| PREMIX | | | |

-continued

| INGREDIENT | I WEIGHT (% WEIGHT) | | II WEIGHT (% WEIGHT) | | III WEIGHT (% WEIGHT) | |
|---|---|---|---|---|---|---|
| Crystalline Fructose | 10.25 | (59.18) | 10.25 | (59.18) | 10.25 | (59.18) |
| Whey Protein Concentrate | 1.73[1] | (9.99) | 3.90[3] | (22.52) | 5.25[5] | (30.31) |
| Other Nonfat Milk Solids | 3.99[2] | (23.03) | 1.82[4] | (10.50) | .47[6] | (2.71) |
| Stabilizer & Emulsifier | .85 | (4.91) | .85 | (4.91) | .85 | (4.91) |
| Egg Yolk Solids | .50 | (2.89) | .50 | (2.89) | .50 | (2.89) |
|  | 17.32 | (100) | 17.32 | (100) | 17.32 | (100) |
| SOLIDS CONTENT OF FINAL PRODUCT | | | | | | |
| Crystalline Fructose | 10.25 | | 10.25 | | 10.25 | |
| Fat | 16.00 | | 16.00 | | 16.00 | |
| Whey Protein Concentrate | 1.73[1] | | 3.90[3] | | 5.25[5] | |
| Other Added MSNF | 3.99[2] | | 1.82[4] | | .47[6] | |
| MSNF from Cream & Skim Milk | 5.78 | | 5.78 | | 5.78 | |
| Stabilizer & Emulsifier | .85 | | .85 | | .85 | |
| Egg Yolk Solids | .50 | | .50 | | .50 | |
|  | 39.10 | | 39.10 | | 39.10 | |

[1]75% Protein and provides 15% of total MSNF
[2]60% Powdered Skim Milk, 40% Dry Buttermilk
[3]55% Protein and provides 34% of total MSNF
[4]Skim Milk powder
[5]35% Protein and provides 45.6% of total MSNF
[6]Dry buttermilk powder

EXAMPLE XIII

The following table is illustrative of MSNF contents of premix compositions not containing whey protein concentrate suitable for use in combination with added quantities of skim milk and cream to make a frozen dessert. For purposes of illustration, the premix contains 57% by weight fructose, 36% by weight MSNF and 7% by weight stabilizer.

| Ingredient | A | B | C | D | E | F | G | H |
|---|---|---|---|---|---|---|---|---|
| Nonfat Dry Milk | 27 | 14 | 31 | 15 | — | 32 | 16 | 15 |
| Dry Buttermilk | — | 14 | — | 15 | 28 | — | 16 | 15 |
| Sodium Caseinate | — | 8 | — | — | 4 | 4 | 4 | 2 |
| Low Lactose Skim Milk | 9 | — | — | 3 | — | — | — | 2 |
| Isolated Whey Protein | — | — | 5 | 3 | 4 | — | — | 2 |
| TOTAL MSNF | 36 | 36 | 36 | 36 | 36 | 36 | 36 | 36 |
| Fructose | 57 | 57 | 57 | 57 | 57 | 57 | 57 | 57 |
| Stabilizer | 7 | 7 | 7 | 7 | 7 | 7 | 7 | 7 |
|  | 100 | 100 | 100 | 100 | 100 | 100 | 100 | 100 |

EXAMPLE XIII FORMULA:

While the invention has been described above in terms of its best known embodiment, it is not to be limited to the specific examples or tables, but is to be accorded the full protection allowed by the following claims.

What is claimed is:

1. A liquid dessert mix suitable for freezing having a solids content of between about 24 and 49% by weight wherein the percent by weight solids comprises about:
   (a) 2 to 25% butterfat,
   (b) 8 to 15% nonfat milk solids selected from the group consisting of nonfat dry milk, dry buttermilk, whey, whey protein concentrate, sodium caseinate, low lactose skim milk powder and mixtures thereof wherein at least 10% by weight of said non fat milk solids consists of a whey protein concentrate having a protein content of between 25 and 75% by weight:
   (c) 7 to 18% of a fructose-based sweetener containing at least 75% by weight fructose selected from the group consisting of substantially pure crystalline fructose, frutose non-carbohydrate sweetener combinations and fructose carbohydrate combinations,
   (d) 0 to 1.5% egg yolk solids, and
   (e) 0.5 to 2.5% of a stabilizer and emulsifier wherein the stabilizer contains from about 20 to 50% by weight of a microcrystalline cellulose.

2. A powdered dessert premix according to claim 1 wherein the fructose-based sweetener is a fructose non-carbohydrate sweetener combination.

3. A powdered dessert premix according to claim 2 wherein the non-carbohydrate sweetener is selected from the group consisting of aspartame and saccharin.

4. A powdered dessert premix according to claim 1 wherein the fructose-based sweetener is a combination of fructose and an additional carbohydrate sweetener.

5. A powdered dessert premix according to claim 4 wherein the additional carbohydrate sweetener is a member selected from the group consisting of glucose, sucrose, maltose, corn syrup solids, invert sugar solids, dried honey and mixtures thereof.

6. A liquid dessert mix according to claim 1 wherein the fructose-based sweetener is substantially pure crystalline fructose.

7. A liquid dessert mix according to claim 6 wherein the solids content is between about 24 to 34% by weight wherein the percent by weight solids comprises about 2 to 7% butterfat, 8 to 15% non fat milk solids, 7 to 11% crystalline fructose, 0 to 1.0% egg yolk solids and 0.5 to 2.5% stabilizer and emulsifier.

8. A liquid dessert mix according to claim 7 wherein the percent by weight solids comprises about 3 to 6% butterfat, 11 to 13% nonfat milk solids, 8 to 10% crystalline fructose, 0.25 to 1.0% egg yolk solids and 0.7 to 2.0% stabilizer and emulsifier.

9. A liquid dessert mix according to claim 8 wherein the whey protein concentrate accounts for between about 20 and 35% of the nonfat milk solids.

10. A liquid dessert mix according to claim 9 wherein the butterfat content is supplied by liquid cream, and the nonfat milk solids content is supplied by liquid cream, liquid skim milk, whey protein concentrate and one or more members selected from the group consisting of nonfat dry milk, dry buttermilk, whey, sodium caseinate and low lactose skim milk powder.

11. A liquid dessert mix according to claim 10 wherein the protein content of the whey protein concentrate is about the same as the protein content of skim milk powder.

12. A liquid dessert mix according to claim 6 wherein the solids content is between about 35 and 49% by weight wherein the percentage by weight solids comprises about 8 to 20% butterfat, 10 to 14% nonfat milk solids, 9 to 14% crystalline fructose, 0 to 15% egg yolk solids and 0.5 to 2.5% stabilizer and emulsifier.

13. A liquid dessert mix according to claim 12 wherein the percent by weight solids comprises about 12 to 18% butterfat, 10 to 13% nonfat milk solids, 10 to 13% crystalline fructose, 0.5 to 1.5% egg yolk solids, and 0.7 to 2.0% stabilizer and emulsifier.

14. A liquid dessert mix according to claim 13 wherein the whey protein concentrate accounts for between about 20 to 35% of the nonfat milk solids.

15. A liquid dessert mix according to claim 14 wherein the butterfat content is supplied by liquid cream, and the nonfat dry milk solids is supplied by liquid cream, liquid skim milk, whey protein concentrate, and one or more members selected from the group consisting of nonfat dry milk, dry buttermilk, whey, sodium caseinate and low lactose skim milk powder.

16. A liquid dessert mix according to claim 15 wherein the protein content of the whey protein concentrate is about the same as the protein content of skim milk powder.

17. A liquid dessert mix according to claim 1 wherein the fructose-based sweetener is a fructose non-carbohydrate sweetener combination.

18. A liquid dessert mix according to claim 17 wherein the non-carbohydrate sweetener is selected from the group consisting of aspartame and saccharin.

19. A liquid dessert mix according to claim 1 wherein the fructose-based sweetener is a combination of fructose and an additional carbohydrate sweetener.

20. A liquid dessert mix according to claim 19 wherein the additional carbohydrate sweetener is a member selected from the group consisting of glucose, sucrose, maltose, corn syrup, invert sugar, honey and mixtures thereof.

21. A dessert mix according to claim 6 which has been dehydrated to a powdered form.

22. A dessert mix according to claim 7 which has been dehydrated to a powdered form.

23. A dessert mix according to claim 8 which has been dehydrated to a powdered form.

24. A dessert mix according to claim 9 which has been dehydrated to a powdered form.

25. A dessert mix according to claim 10 which has been dehydrated to a powdered form.

26. A dessert mix according to claim 11 which has been dehydrated to a powdered form.

27. A dessert mix according to claim 12 which has been dehydrated to a powdered form.

28. A dessert mix according to claim 13 which has been dehydrated to a powdered form.

29. A dessert mix according to claim 14 which has been dehydrated to a powdered form.

30. A dessert mix according to claim 15 which has been dehydrated to a powdered form.

31. A dessert mix according to claim 16 which has been dehydrated to a powdered form.

32. A dessert mix according to claim 17 which has been dehydrated to a powdered form.

33. A dessert mix according to claim 18 which has been dehydrated to a powdered form.

34. A dessert mix according to claim 19 which has been dehydrated to a powdered form.

35. A dessert mix according to claim 20 which has been dehydrated to a powdered form.

36. A powdered dessert premix to be added to a combination of liquid milk and cream to prepare a frozen dessert which comprises about:
  (a) 10 to 54% by weight non fat dry milk solids selected from the group consisting of non fat dry milk, dry buttermilk, whey, whey protein concentrate, sodium caseinate, low lactose skim milk power and mixtures thereof and wherein whey protein concentrate having a protein content of between about 25 to 75% by weight is present such that the ratio of whey protein concentrate to the remainder of the non fat milk solids is at least 0.2:1,
  (b) 37 to 86% by weight of a fructose-based sweetening agent containing at least 75% by weight fructose selected from the group consisting of substantially pure crystalline fructose, fructose non-carbohydrate sweetener combination and fructose carbohydrate combinations,
  (c) 2 to 21% by weight stabilizer and emulsifier wherein the stabilizer contains from about 20 to 50% by weight of a microcrystalline cellulose, and
  (d) 0 to 10% by weight egg yolk solids.

37. A powdered dessert premix according to claim 36 wherein the fructose-based sweetening agent is substantially pure crystalline fructose.

38. A powdered dessert premix according to claim 37 containing about 13 to 54% by weight nonfat milk solids, 40 to 83% by weight substantially pure crystalline fructose and 2 to 21% by weight stabilizer and emulsifier.

39. A powdered dessert premix according to claim 38 wherein the nonfat milk solids consist of a mixture of whey protein concentrate and other nonfat milk solids from the nonfat milk solids group, in a ratio of 0.5:1 to 5:1 whey protein concentrate to said other nonfat milk solids.

40. A powdered dessert premix according to claim 39 comprising 14 to 29% whey protein concentrate, 6 to 24% other nonfat milk solids, 49 to 65% crystalline fructose, 3 to 9% stabilizer and 0 to 6% egg yolk solids.

41. A powdered dessert premix according to claim 40 wherein the egg yolk solids content is between 2.0 and 6.0% by weight.

42. A powdered dessert premix according to claim 41 wherein the whey protein concentrate contains approximately the same protein concentration as skim milk powder or dry buttermilk.

43. A powdered dessert premix according to claim 41 wherein the premix also contains a flavoring.

44. A powdered dessert premix according to claim 43 wherein the flavoring is a chocolate flavoring.

45. A powdered dessert premix according to claim 41 containing no egg yolk solids.

46. A powdered dessert premix according to claim 38 wherein the nonfat milk solids are entirely a whey protein concentrate.

* * * * *